United States Patent Office 3,450,542
Patented June 17, 1969

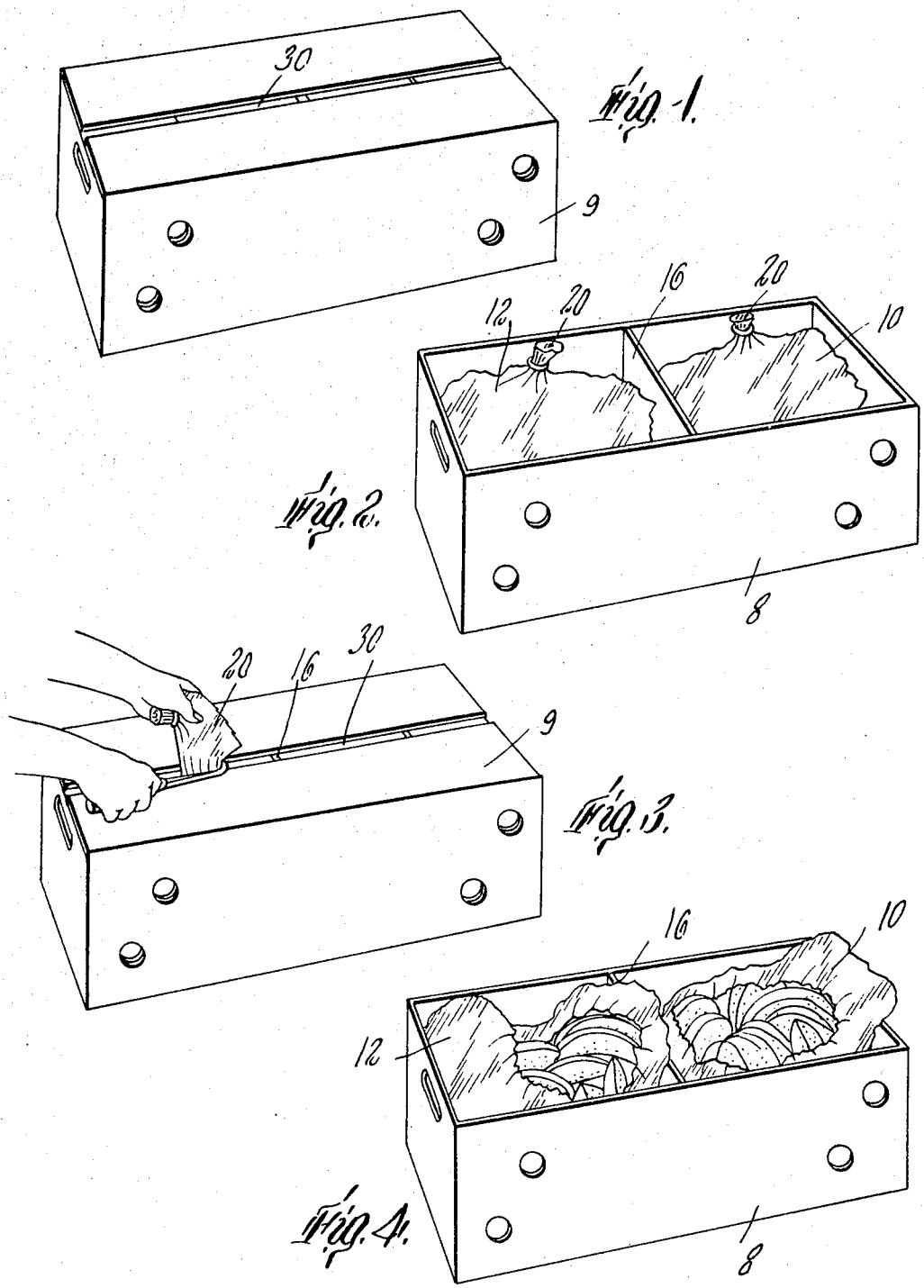

3,450,542
CONTROLLED ATMOSPHERE STORAGE OF
GREEN BANANAS
Adnan M. Badran, La Lima, Honduras, assignor to
United Fruit Company, Boston, Mass., a corporation of New Jersey
Filed Feb. 23, 1965, Ser. No. 434,247
Int. Cl. A23b 7/14; B65b 31/02
U.S. Cl. 99—154                                 9 Claims

ABSTRACT OF THE DISCLOSURE

Bananas at a pre-climacteric stage of respiration are packaged in sealed imperforate flexible gas-permeable film under refrigeration and in the presence of a reduced $O_2$ and elevated $CO_2$ atmosphere which preserves the bananas such that they undergo a normal ripening cycle commencing after the seal is broken.

---

This invention relates to the holding of green bananas against ripening and the development of rots during storage and transportation incident to their delivery to the jobber or other destination for ultimate ripening in preparation for delivery to the consumer, and more particularly to a system for preventing the ripening of harvested green bananas so that they may be transported and/or warehoused from the point of origin, i.e. the farm or other assembly point, through to the destination for ripening in a more mature totally green, fresh, moist and rot-free condition irrespective of emergencies or man-made delays for as much as four weeks. Thus the duration of the post harvest storage life of the fruit can be so regulated that the fruit can be brought to a fully ripened state in optimum condition for human consumption at an identical predictable time despite variations by a matter of days in the time of harvest or so that the post harvest life of fruit harvested at substantially identical times is generally prolonged. The bananas may at any time during the holding period be released for ripening to an optimum condition for human consumption.

Bananas are an extremely perishable commodity having a rate of metabolism in normal atmospheric air which is much more rapid than other commonly consumed fruit. In the climacteric stage, their oxygen demand rises to the order of 100 to 180 cc. of $O_2$ per kilogram of bananas per hour, as contrasted with other fruits such as apples and pears, whose comparative oxygen demand ranges from 6 to a maximum of only about 40 cc. of $O_2$ per kilogram of fruit per hour. Even bananas in the firm, green, preclimacteric state, whose oxygen demand is in the range of 40 to 60 cc. per kilogram per hour, can thus be classified as more perishable than other common fruits.

Heretofore, it has been the practice to attempt to hold the bananas in a firm, green, preclimacteric condition for periods of time adequate to permit transportation from the growing area in tropical countries to distant destination without the development of ripes or the turning of peel color from green to yellow, and softening and spoilage of the fruit, both by harvesting the bananas when they are green and by resorting to temperature control and ventilation of the storage area to retard the rate of metabolism which tends to increase rapidly during post harvest handling and storage of the fruit. Thus it is common at present to store and transport bananas at temperatures between 53° and 58° F. both to reduce the rate of metabolism and to remove both field heat and heat generated by fruit metabolism. Storage at higher temperatures is detrimental to holding the fruit in a desired firm, green condition since the rate of fruit metabolism is greater, it being a rule of thumb that for every ten degrees centigrade temperature increase, the rate of metabolism increases to an extent doubling the oxygen demand, leading to rapid coloring of the peel of the banana, ripening as indicated by conversion of starch to sugar, softening of the fruit and eventually overripeness.

Temperature control and storage ventilation has, to date, remained the only commercially feasible means for lengthening the post harvest life of bananas. Nevertheless, it has been suggested in U.S. Patent No. 3,102,778 that perishable plant material including bananas, may be given an increased post harvest life by continually flushing a chamber, such as a refrigerator chamber in which the products are stored, with a flow of gas having a reduced oxygen and raised carbon dioxide content compared with that of air.

Storage of materials in this manner necessitates not only substantial investment in equipment for preparing gas of proper content and for circulating it through the chamber, but also requires a continuous expenditure of energy to operate such equipment as well as continual automated or human monitoring to insure that the proper flow of the selected gas mixture is continually maintained. Expenditures involved in providing and operating this type of equipment is a distinct drawback.

In addition, such a chamber is a unit captive to the supply and circulating system, as are the plant materials contained therein. If such equipment is installed, for example, in a ship or a truck trailer, the plant materials have to be removed from the controlled atmosphere whenever the chamber has to be unloaded for return of the vehicle or ship for new loads, thus releasing the material from the controlled atmosphere at times dictated by necessary movements of the vehicles or ships and not according to a time schedule determined on the basis of delivery of the fruit to a customer destination in a still green state of post harvest maturity.

It is hence, a primary object of this invention to provide a system for holding harvested green bananas against ripening by maintaining them in a controlled atmosphere of suitably reduced oxygen and elevated carbon dioxide content which eliminates all need for captive gas preparation and replenishing equipment such as described in the aforesaid patent and eliminates continual power consumption for their operation.

According to this invention there is provided a novel manually-portable banana pack, such as a box, bag, or other container, enclosing bananas preferably in the form of fingers, clusters, or hands, with the bananas maintained in a substantially stable controlled atmosphere without having any tangible connections to gas-producing or gas-circulating equipment. The pack is thus transportable as an independent unit from packing stations on the farm to warehouse to dock to ship to dock to vehicle to warehouse to vehicle to customer without removing the bananas from the controlled atmosphere in which they are packed. The pack is thus, in effect, one which, after completion of the packing steps is self-maintaining and self-regulating insofar as its controlled atmosphere is concerned.

Banana packs of this invention comprise individual units of bananas, preferably fingers, clusters, or hands, sealed in the preclimacteric stage within an imperforate enclosure of initial overall internal volume correlated with the weight of contained bananas and formed in whole or in part of a flexible imperforate membrane or film having gas permeability characteristics as hereinafter defined.

The invention is founded upon comparative studies of respiratory rates of bananas in controlled atmosphere and the gaseous diffusion rates of plastic films, such as polyethylene, accompanied by a resulting discovery that, first there is a sufficient correlation between the oxygen diffusion rate per square inch of certain polyethylene films and the oxygen demand per kilogram of green preclimacteric bananas so that diffusion into an enclosure through a proper area of the film may be rapid enough to prevent the enclosure from becoming exhausted of $O_2$ with attendant suffocation and ruin of an enclosed particular weight of bananas, but without being so rapid as to elevate the internal $O_2$ content above a percentage equilibrium content conducive to slowing the metabolism of the enclosed bananas; and, secondly, that there can be, simultaneously, a sufficient correlation between the $CO_2$ diffusion rate of the same area of the same film and the rate of exhalation of $CO_2$ per kilogram of enclosed bananas that $CO_2$ diffusion through the film to the outside atmosphere is rapid enough to prevent accumulation of $CO_2$ within the enclosure to any amount above a percentage equilibrium which is low enough not to deleteriously affect the flavor, aroma or texture of the enclosed bananas upon ripening.

Specifically, by packing proper quantities of green bananas before the onset of the climacteric rise in respiration, evidenced by an oxygen demand rapidly rising above about 60 cc. per kilogram per hour, in sealed bags of polyethylene or similar flexible plastic film material having certain gas permeability and controlled initial $O_2$ content, the internal gas contents of the bags, after an initial period, can attain equilibria in the range of, by volume, from about 1 to 5.5 percent $O_2$ and about 2.5 to about 7 percent $CO_2$, with the $CO_2$ percent content higher than the $O_2$ percent content, which will be substantially maintained for a matter of up to about 28 days at a storage temperature between 53° and 70° F., during which time the enclosed bananas, though unspoiled, and later ripenable, will remain in the green preclimacteric stage, but upon opening the bags and exposing the contents to atmospheric air of normal 20–21% $O_2$ and .003% $CO_2$ content or to other controlled ripening environment, normal ripening will proceed to a state acceptable for human consumption. In cases of optimum correlation as hereinafter described, holding periods of up to 28 days have been attained for harvested green bananas without destroying consumer requirements of flavor, aroma, color and texture upon ripening.

The important consequences and economical advantages of such packing are almost self-evident. Cargoes of bananas, even though harvested green, many times arrive at destinations remote from banana-growing countries with a serious percentage of the cargo in yellowing or ripened condition, and at times with varying degrees of infection by rot-producing organisms. Under the system of this invention, bananas may be harvested after full maturity before the onset of the climacteric rise and still arrive at such destination in fully green condition, fresh appearing, moist, and free of rots and molds, by the simple expedient of confining readily portable weights of such bananas within a simple imperforate flexible membrane enclosure and may be held for further periods at their destination before unsealing and exposure to ripening environments at such time, prior to consumer delivery, as will insure delivery time-wise of quality fully ripened fruit according to daily consumer demands. Such an accomplishment without installation of special equipment in transporting vehicles, ships and warehouses, is not only of major importance to the banana industry in avoiding spoilage of fruit due to storms, accidents, strikes, etc., but also has the advantage, which cannot now be enjoyed, of scheduling departure of ships from the banana-growing countries upon capacity loading, regardless of the predicted immediate demand at the ships' destination, any excess to be held over in warehouses at origin or at destination, rather than scheduling departures, regardless of ship capacity, or partially loaded ships containing only that quantity of fruit which can be disposed of immediately upon arrival. At times, then, shipments departing at different times containing bananas harvested at different times may simultaneously accumulate in a destination warehouse and subsequently, if simultaneously unsealed, may reach fully ripened stage on an identical day. The sealed holdover period thus becomes variable at will, while keeping the number of days required to fully ripen after unsealing substantially the same under conventional ripening conditions as are used in the industry.

In order that a bag reaches a proper equilibria of controlled atmosphere, the bag, at the time of sealing, may be provided with an internal atmosphere approaching the desired equilibrium $O_2$ and $CO_2$ content. This can be achieved by charging the bag with such an atmosphere or flushing with an inert gas just prior to the sealing, but this has been found to be unnecessary provided the amount of initially sealed in atmospheric air is deliberately minimized with respect to the weight of the contained bananas. This may most readily be done by removing excess contained air from the bag before sealing, leaving a sufficient amount of $O_2$ to satisfy initial respiration requirements of the contained bananas, but not enough $O_2$ to trigger the onset of the climacteric stage, in which case $CO_2$ exhalation would rise so fast that $CO_2$ accumulates in the bag to a deleterious level, i.e. above about 7%, due to inadequate rate of $CO_2$ escape through the bag. Such air removal may be readily accomplished by holding the mouth of the bag momentarily over a suction head to cause the bag to collapse into a configuration conforming to the external contour of the enclosed bananas or by immersing the bag in an incompressible fluid, such as water, with its mouth open to the atmosphere, or by otherwise subjecting the bag to a differential outside pressure to exhaust the excess air through the open mouth before sealing. In any event, the exhaustion step is not intended to substantially lower the pressure in the bag as by drawing a vacuum, since any strong vacuum treatment is undesirable and unnecessary. The function of the exhaustion is rather to extract most of the air from the bag while leaving the remainder at substantially atmospheric pressure and in a quantity to insure that the rate of metabolism will be quickly suppressed and prevent exhalation of $CO_2$ at a rate in excess of the diffusion capacity of the bag.

EXAMPLE I

Mature green bananas were harvested while still in the pre-climacteric stage and processed in conventional manner up until the time of boxing. A 25″ x 15″ x 8.5″ fiberboard box was provided with air circulation apertures in the top, bottom and sides and with a vertical partition dividing the box into two equal compartments, with each compartment being adapted to hold about 20 lbs. of bananas in the form of hands and fingers per compartment. A total of about 9.1 kilograms of fingers (56) were placed in each of two identical flat polyethylene bags having a proposed final internal surface dimension of 56″ x 22″ or 1232 square inches made from 150 gauge (1.5 mils) polyethylene (Gering Products, Inc.—melt index of 2–3.5) having permeability of $CO_2$ of 2797 cc.; to $O_2$ of 1899 cc. both per 100 square inches per 24 hours at STP (0° C., 760 mm. of Hg), as measured substantially in accordance with the procedures described in Journal Applied Polymer Science, volume 7, pages 2035–2051, 1963. Excess air in an amount of about 5830 cc. as measured for one bag was exhausted through the mouths of the bags so that the bags collapsed around the contents leaving a calculated total volume of normal atmospheric air of about 5020 cc. in the measured bag to reduce the amount of $O_2$ immediately available to the enclosed bananas to about 110.3 cc. of $O_2$ per kilogram of banana content. The mouths were sealed with a tight twist tie held by elastic bands, and the box containing the two bags was maintained at 60° F. temperature. The internal surface area of the film confining the contents was 1 square inch per 0.0074 kilogram of enclosed banana.

At the end of the following hours, the $O_2$ and $CO_2$ contents of the internal environment was determined by withdrawing each time a 100 cc. sample of the then internal atmosphere of the bag through a hypodermic needle of a syringe, sealing the rupture after withdrawal of the needle. The results were as follows:

| Hours | Percent $O_2$ | Percent $CO_2$ |
|---|---|---|
| 4 | 6-7 | 2 |
| 8 | 4-5 | 3-4 |
| 12 | 4-5 | 3-4 |
| 24 | 3 | 3-4 |

Other samples similarly packed showed at the end of six days storage at 58° F., mean values for ten samples in each of three groups of 2.9%, 2.7%, 2.3%, respectively, of $O_2$ and 5.4%, 5.9%, 5.5%, respectively, of $CO_2$ with a maximum deviation from the means of no more than 0.5%.

At the end of the six day period, the samples were unsealed by pulling out the tied ends of the bag through the ventilation apertures in the tops of the boxes and severing the ties to unseal the bags, spreading the edges of the resulting opening to allow ingress of a normal ripening atmosphere of normal air containing during the first 24 hours only, 0.05-0.1% ethylene at 64° F. followed by ventilation at 58-60° F. The bananas were still essentially green in color at the time of opening, and, being unspoiled, ripened normally in a 6-7 day period while still in the boxes in the opened bags, producing a commercially excellent fully ripened banana with good flavor, aroma, and texture indistinguishable from high-quality bananas handled in the usual commercial manner.

In the drawings, FIG. 1 shows a 2-piece box with a bottom 8 and cover 9. FIG. 2 shows the cover removed with the sealed bags 10 and 12 separated by partition 16. FIG. 3 shows one bag neck 20 pulled up through a top ventilating opening 30, in cover 9, being cut off. FIG. 4 shows the bags spread open to allow access of ambient atmosphere.

EXAMPLE II

The procedure of Example I was followed except that the banana units for each of the two compartments of the box were packed in a double sized polyethylene bag with one unit in each end of the bag and the intermediate collapsed exhausted section of the bag being draped over the central partition in the box. Similar good results were secured.

EXAMPLE III

Another experiment was carried out in the same manner using 9.1 kilograms fruit in the same fiberboard box compartment of 12.5″ x 15″ x 8.5″ and fruit was enclosed by 150 gauge polyethylene film having the same diffusion property to $CO_2$ and $O_2$ as in Example I. The area of film which served as a semipermeable membrane to gases was 1344 square inches which gave a ratio of 1 square inch of film per 0.0065 kilogram fruit. Gas analyses which are shown in the following table indicated the maintenance of a desired modified atmosphere of $CO_2$ and $O_2$ throughout a holding of green fruit for 30 days at 60° F. Fruit was fresh and green (unripe) presenting good appearance with minimal rots.

| Gas level, percent | Days at 60° F. | | | | | | | |
|---|---|---|---|---|---|---|---|---|
| | 2 | 6 | 10 | 14 | 18 | 22 | 26 | 30 |
| Oxygen | 3.2 | 2.4 | 2.0 | 1.5 | 1.5 | 2.2 | 1.5 | 1.0 |
| | 3.5 | 3.7 | 1.9 | 1.8 | 1.5 | 1.6 | 1.5 | 1.0 |
| Carbon dioxide | 4.8 | 5.2 | 6.7 | 5.4 | 4.0 | 4.2 | 4.0 | 4.9 |
| | 5.1 | 5.0 | 5.2 | 4.7 | 3.2 | 4.5 | 4.7 | 4.0 |

Each value represents the mean of the two compartments.

Another experiment was carried out using the same procedure as in Example III except the holding temperature for 28 days was 70° F. instead of 60° F. The following table shows the maintenance of a desirable modified atmosphere of $CO_2$ and $O_2$ at 70° F. throughout a holding period of 28 days.

| Gas level, percent | Days at 70° F. | | | | | | | |
|---|---|---|---|---|---|---|---|---|
| | 2 | 6 | 10 | 14 | 18 | 22 | 26 | 28 |
| Oxygen | 1.3 | 0.9 | 3.7 | 2.9 | 2.2 | 1.4 | 3.3 | 2.5 |
| Carbon dioxide | 5.5 | 5.0 | 4.6 | 5.0 | 4.3 | 5.0 | 8.8 | 5.7 |

Each value represents the mean of four compartments.

Raising the holding temperature 10° F. did not upset the atmosphere level of $O_2$ and $CO_2$ during 28 days holding period. The only effect of 70° F. holding temperature was a faster establishment of the desirable atmosphere of $CO_2$ and $O_2$ as shown in the following table.

| Holding temperature, ° F. | Gas level, percent | Hours from sealing | | |
|---|---|---|---|---|
| | | 4 | 8 | 16 |
| 60 | $O_2$ | 6.8 | 5.2 | 4.3 |
| | $CO_2$ | 2.0 | 3.1 | 3.8 |
| 70 | $O_2$ | 4.8 | 4.0 | 2.0 |
| | $CO_2$ | 2.8 | 3.5 | 4.5 |

EXAMPLE V

The packed green bananas were also held for six days under ambient temperature which showed a fluctuation range of 14° F. After holding for various numbers of days at ambient temperatures, each bag was held for six days thereafter at 60° F., then unsealed and put through a 7-day ripening schedule with 24-hour initial exposure to ethylene. The results were as follows:

| Days at ambient temperature | Ambient temperature | | | Gas level (percent) | | Further days at 60° F. | Gas level (percent) | | Total days from green to ripe stage |
|---|---|---|---|---|---|---|---|---|---|
| | Max. | Min. | Ave. | $O_2$ | $CO_2$ | | $O_2$ | $CO_2$ | |
| 1 | 80 | 78 | 79 | 1.2 | 5.9 | 6 | 2.1 | 5.6 | 14 |
| 2 | 80 | 74 | 77 | 1.1 | 6.1 | 6 | 2.6 | 4.9 | 15 |
| 3 | 79 | 68 | 74 | 3.3 | 6.1 | 6 | 3.0 | 4.7 | 16 |
| 4 | 70 | 64 | 67 | 2.1 | 5.4 | 6 | 2.8 | 5.7 | 17 |
| 5 | 70 | 62 | 66 | 2.9 | 5.1 | 6 | 3.4 | 4.3 | 18 |
| 6 | 78 | 64 | 71 | 3.1 | 5.1 | 6 | 4.0 | 4.4 | 19 |

Each gas value represents the mean of 10 compartments.

Fruit weight, polyethylene film permeability range to gases, and the dimension of polyethylene film and box were in the same manner as described previously. Green fruit showed no ripening or fermentation and was fresh and free of rots. Ripened fruit exhibited good flavor, aroma and texture.

EXAMPLE VI

One green hand weighing 2.7 kilograms was placed in a flat polyethylene bag having an internal surface area exposed to the fruit of 457 square inches. This allowed 1 square inch per about 0.006 kilogram fruit. The polyethylene film was the same as in Example 1. Excess air of 3380 cc. was exhausted through the mouth of the bag so that the bag collapsed around the content leaving a calculated total volume of normal atmospheric air of about 942 cc. (188.4 cc. $O_2$) or about 349 cc. air per kilogram fruit (70 cc. $O_2$). The mouth was sealed as before and the bag maintained at 60° F.

Fruit in the bag was maintained fresh and green for 30 days, while unbagged fruit turned ripe within 12 days. The desirable atmospheric level of $O_2$ and $CO_2$ was maintained throughout the holding period as shown in the following table. Fruit exhibited minimum rots and good appearance.

| Gas level, percent | Days at 60° F. | | | | | | | | |
|---|---|---|---|---|---|---|---|---|---|
| | 3 | 6 | 9 | 12 | 15 | 18 | 21 | 24 | 27 | 30 |
| Oxygen | 5.0 | 4.0 | 5.2 | 3.0 | 4.0 | 2.7 | 3.0 | 2.4 | 2.4 | 2.2 |
| Carbon dioxide | 4.0 | 4.8 | 5.0 | 5.5 | 5.0 | 6.0 | 5.9 | 5.9 | 6.0 | 6.0 |

Each bag was opened and ripened as described in Example I. The ripe fruit showed good taste and aroma and was free from off-flavor or other defects.

EXAMPLE VII

Forty pounds of green bananas were sealed in a single bag of polyethylene film as used in Example I. The bag contained 112 fingers weighing 18.2 kg. and was placed in a 22 x 15 x 8.5 inch box omitting the partition 16. The internal surface area of the sealed bag was 2,286 sq. in. or 1 sq. in. per about .008 kg. of bananas. The results after thirty days at 60° F., sealed, followed by ripening, were excellent. The atmospheric level of $O_2$ remained between 1 and 4.6% over the thirty-day period after equilibrium was reached; and the $CO_2$ level remained between 5.4 and 7%.

In the case of some variaties of bananas, e.g. Gros Michel and Cocos, the onset of the climacteric rise sometimes occurs on the plant before full maturity or occurs more quickly after harvesting than with other varieties such as those in the Cavendish group. When packing any variety in accordance with this invention, it is essential that the bananas be both harvested and sealed in the bag before the onset of the climacteric rise in respiration. In the latter varieties, the onset of the climacteric rise does not occur until later in the post-harvest step, allowing the harvesting and more liesurely packing of heavier fruit of the latter varieties.

Other gauge polyethylene film may be used, depending upon the contemplated storage period. The thicker the film, the sooner the onset of anaerobic breakdown; and the thinner the film, the sooner the onset of ripening. For less than 5 or 6 day holding periods, polyethylene film ranging from 125 to 200 gauge has ben found to be useful when the films have gas permeabilities ranging, for $CO_2$, from 3356 down to 2000 cc. per 100 square inches per 24 hours, and for $O_2$, from 2279 down to about 1400 cc. per 100 square inches per 24 hours at STP as determined by the hereinbefore identified test. But for holding periods longer than 16 days, 150 gauge polyethylene having permeabilities of $CO_2$:2797; $O_2$:1899 was used since 125 gauge proved too thin and 200 gauge too thick. These values expressed on a per mil basis are for $CO_2$, 4195 and for $O_2$, 2848 cc.

Other gas permeable plastic films such as pliofilm, polypropylene, polystyrene, cellulose acetate and vinyl films which have suitable gas permeabilities due to the presence of specific plasticizers or otherwise and also possess the other essential physical characteristics provided by polyethylene, can equally well be used, though in their present commercial forms they do not generally have as high $O_2$ diffusion rates as low density polyethylene, and therefore would have to be used in such thinness as to raise their $CO_2$ permeability too high, and with less tensile strength than is desirable as rupture cannot be countenanced. Preferably they should be capable of controlling the internal atmosphere over a period of at least 5 days at a percentage figure above 1% and not exceeding 7% $O_2$ after the first 4 hours of residence at 58° F. and a $CO_2$ content not exceeding 4-5.5% after the same 4 hours residence. Average preferred values are 2-3% oxygen and 5% $CO_2$ after the initial four hour period.

To insure that $CO_2$ accumulation in the bag will never exceed 7%, the volume of atmospheric air in the bag at time of sealing should contain less $O_2$ than would trigger onset of the climacteric ripening stage during the holding period. There should preferably be less than 555 cc., and certainly no more than 800 cc. of atmospheric air (less than 111 cc. and no more than 160 cc. of $O_2$) per kilogram of bananas after evacuation.

In general, the total square inch area of single thickness flexible gas-permeable film should be of the order of at least 1 square inch per each 0.006–0.008 kilograms of contained bananas, but depending upon the permeability. While windows of film may be used in an otherwise imperforate package, such a composite arrangement is likely to contain too much air at the outset unless the impermeable portion of the film is flexible and can closely conform to the external contour of the enclosed bananas. Also, excess square inch area per kilogram of bananas is harmful only if it unduly increases the initial internal volume or causes folds which unduly reduce the square inch area of single thickness film per kilogram of enclosed bananas.

In addition to prolonged post harvest storage, it has been found that crown rot occurrence caused by infection and growth of micro-organisms on the cut surface of the vegetable tissue is minimized in packs of this invention and that moisture accumulation, despite packaging at relatively high humidity (90% or above), is not detrimental.

What is claimed is:

1. A banana pack comprising an imperforate sealed container of manually-portable size formed at least in part of flexible imperforate gas-permeable plastic sheet material having a thickness of from 125–200 gauge and a permeability to $O_2$ of the order of 2848 cc. and to $CO_2$ of the order 4195 cc. both per mil per 100 square inches per 24 hours at STP, and, confined within said sealed container, at least a 5-day internal resident of said sealed container comprising a manually-portable weight of harvested, unspoiled, potentially ripenable bananas at a pre-climacteric stage of ripening surrounded by an atmosphere containing less than 5.5% by volume of $O_2$ and less than 7% by volume of $CO_2$, said bananas being ripenable to a fully ripened state acceptable for human consumption upon rupturing the sealed container to expose the contained bananas to a ripening atmosphere of increased $O_2$ and reduced $CO_2$ content.

2. A banana pack as claimed in claim 1, wherein the $O_2$ content of said atmosphere is between 1 and 5.5% by volume and the $CO_2$ content is between 2.5 and 7% by volume.

3. A banana pack as defined in claim 1 or 2, wherein the $O_2$ content is less than the $CO_2$ content percentagewise by volume.

4. A banana pack as defined in claim 1 or 2, wherein the container is a bag of gas-permeable low density polyethylene sheet material.

5. A banana pack comprising a sealed bag formed of polyethylene film having a thickness of from 125–200 gauge and a permeability to $O_2$ of the order of 2848 cc., and to $CO_2$ of the order of 4195 cc. both per mil per 100 square inches per 24 hours at STP and, sealed within said polyethylene bag, up to about 40 lbs. of harvested green bananas at a pre-climacteric stage of respiration, said bananas being ripenable to a fully ripened state acceptable for human consumption upon rupturing the sealed container to expose the contained bananas to a banana ripening atmosphere.

6. A banana pack comprising a sealed container formed of flexible polyethylene film having a thickness of from 125–200 gauge and a permeability to $O_2$ of the order of 2848 cc.; and to $CO_2$ of the order of 4195 cc., both per mil per 100 square inches per 24 hours at STP and, sealed within said container up to about 18.2 kilograms of harvested green bananas at a pre-climacteric stage of respiration and, surrounding the bananas, atmospheric air in an amount less than 800 cc. per kilogram of enclosed bananas.

7. A banana pack as claimed in claim 6, wherein the sealed-in air content is about 555 cc. per kilogram of bananas.

8. A method for post harvest holding of green bananas against ripening and development of rots for periods longer than those obtainable when the bananas are exposed to air of normal atmospheric gas content comprising isolating an individual portable weight of harvested bananas from atmospheric air by surrounding the bananas while they are at a pre-climacteric stage of ripening with imperforate plastic sheet material having a thickness of from 125–200 gauge and a permeability to $O_2$ of the order of 2848 cc., and to $CO_2$ of the order of 4195 cc., both per mil per 100 square inches per 24 hours at STP, forming an enclosure, extracting air from the enclosure to collapse the sheet material into a configuration conforming to the general external contour of said bananas and sealing the enclosure leaving therein no more than 160 cc. of $O_2$ per kilogram of bananas, the weight of included bananas being not more than .008 kilogram per each square inch of internal surface area of said sheet material so that a relatively stable equilibrium of between 1 and 5.5% $O_2$ and between 2.5 and 7% $CO_2$ gaseous content is established as the atmosphere within said enclosure as a result of consumption of the $O_2$ content originally contained in the enclosure by respiration of said bananas and by gas diffusion through said permeable material within eight hours of commencement of said isolation and is maintained for at least four weeks under a temperature of 53–70° F.

9. A method for post harvest holding of green bananas against ripening and development of rots for periods longer than those obtainable when the bananas are exposed to air of normal atmospheric gas content comprising placing harvested green bananas within a bag formed of polyethylene sheet material having a thickness of from 125 to 200 gauge and a permeability to $O_2$ in the range of 2279 to 1400 cc., and to $CO_2$ in the range of 3356 to 2000 cc., both per 100 square inches per 24 hours at STP, extracting excess air from the bag to collapse the sheet material into a configuration conforming to the general external contour of the enclosed bananas and sealing the bag.

References Cited

UNITED STATES PATENTS

| | | | |
|---|---|---|---|
| 3,249,445 | 5/1966 | Hackett | 99—171 |
| 3,102,778 | 9/1963 | Bedrosian et al. | 99—154 |
| 3,099,350 | 7/1963 | Hammond | 99—171 |
| 2,571,340 | 10/1951 | Carson | 99—154 |

OTHER REFERENCES

Karel, et al.: Control of Respiratory Gases, Technical Engineering Section. February, 1964, pp. 123–127, 190–192.

Gerhardt et al.: Sealed Film Lug Liners for Packing Bing Cherries, U.S. Department of Agriculture. Marketing Series, Marketing Res. Division, September, 1956. Summary and pp. 1–8.

RAYMOND N. JONES, *Primary Examiner.*

J. M. HUNTER, *Assistant Examiner.*